United States Patent
Seong

(10) Patent No.: US 10,062,871 B2
(45) Date of Patent: Aug. 28, 2018

(54) RECHARGEABLE BATTERY WITH TABS

(71) Applicant: Samsung SDI Co., LTD., Yongin-si, Gyeonggi-do (KR)

(72) Inventor: Jae-Il Seong, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 208 days.

(21) Appl. No.: 14/946,542

(22) Filed: Nov. 19, 2015

(65) Prior Publication Data

US 2016/0149193 A1    May 26, 2016

(30) Foreign Application Priority Data

Nov. 26, 2014    (KR) .................. 10-2014-0166580

(51) Int. Cl.
- *H01M 2/22* (2006.01)
- *H01M 2/04* (2006.01)
- *H01M 10/04* (2006.01)

(52) U.S. Cl.
CPC .......... *H01M 2/0469* (2013.01); *H01M 2/22* (2013.01); *H01M 10/0431* (2013.01); *H01M 2220/20* (2013.01); *H01M 2220/30* (2013.01)

(58) Field of Classification Search
CPC .................................................... H01M 2/22
USPC ....................................................... 429/179
See application file for complete search history.

(56) References Cited

U.S. PATENT DOCUMENTS

| | | | |
|---|---|---|---|
| 2006/0099504 A1* | 5/2006 | Kim | H01M 2/027 429/176 |
| 2006/0177733 A1* | 8/2006 | Ha | H01M 2/0212 429/159 |
| 2006/0216593 A1* | 9/2006 | Jung | H01M 2/06 429/178 |
| 2010/0021802 A1* | 1/2010 | Yang | H01M 2/0212 429/91 |

FOREIGN PATENT DOCUMENTS

| | | |
|---|---|---|
| JP | 9-320551 A | 12/1997 |
| JP | 2012142126 A * | 7/2012 |
| KR | 10-1269973 B1 | 5/2013 |

OTHER PUBLICATIONS

Machine Translation of JP 2012-142126 originally published to Shinoda on Jul. 26, 2012.*

* cited by examiner

*Primary Examiner* — Jonathan G Leong
(74) *Attorney, Agent, or Firm* — Knobbe Martens Olson & Bear LLP

(57) ABSTRACT

A rechargeable battery is disclosed. In one aspect, the battery includes an electrode assembly including a first electrode, a second electrode, and a separator interposed between the first and second electrodes and a case accommodating the electrode assembly, wherein an opening is formed in the case. The battery also includes a cap plate coupled to and closing the opening of the case, a terminal placed to pass through the cap plate and a first tab interconnecting the terminal and the first electrode, wherein the first tab includes a stretchable first drawn portion.

16 Claims, 6 Drawing Sheets

RECHARGEABLE BATTERY WITH TABS

INCORPORATION BY REFERENCE TO ANY PRIORITY APPLICATIONS

This application claims priority to and the benefit of Korean Patent Application No. 10-2014-0166580 filed in the Korean Intellectual Property Office on Nov. 26, 2014, the entire contents of which are incorporated herein by reference.

BACKGROUND

Field

The described technology generally relates to a rechargeable battery.

Description of the Related Technology

Rechargeable batteries can be repeatedly charged and discharged, unlike primary batteries, which are not rechargeable. Low-capacity rechargeable batteries are used for small, portable electronics such as mobile phones, laptop computers, or camcorders, and large-capacity rechargeable batteries are widely used as power sources for driving motors of hybrid vehicles.

Typical examples of rechargeable batteries include nickel-cadmium (Ni—Cd) batteries, nickel-hydrogen (Ni-MH) batteries, and lithium-ion (Li-ion) rechargeable batteries. Particularly, lithium-ion rechargeable batteries can achieve three times higher operating voltage than both nickel-cadmium batteries and nickel-hydrogen batteries frequently used in power supplies for portable electronics. Moreover, they are widely used because of their high energy density per unit weight.

Rechargeable batteries generally use lithium oxides as positive active materials and carbon materials as negative active materials. In general, rechargeable batteries are classified into liquid electrolyte batteries and polymer electrolyte batteries by the type of electrolyte. Batteries using liquid electrolytes are referred to as lithium-ion batteries, and batteries using polymer electrolytes are referred to as lithium-polymer batteries.

SUMMARY OF CERTAIN INVENTIVE ASPECTS

One inventive aspect is a rechargeable battery with tabs.

Another aspect is a rechargeable battery which is small in thickness and prevents corrugations on a positive or negative electrode.

Another aspect is a rechargeable battery including: an electrode assembly having a first electrode, a second electrode, and a separator interposed between the first and second electrodes; a case with a space for accommodating the electrode assembly; a cap plate coupled to an opening formed in the case; a terminal placed to pass through the cap plate; and a first tab for electrically connecting the terminal and the first electrode, the first tab having a first drawn portion which is stretchable.

The first drawn portion may be made up of a plurality of corrugations, and the width of the first drawn portion may be greater than $\frac{1}{10}$ of the width of the inside of the case and less than $\frac{1}{2}$ of the width of the inside of the case.

A support portion may be bent from the upper end of the first tab so as to be parallel to the cap plate and electrically connected to the terminal, and a second tab for electrically connecting the cap plate and the second electrode may be placed at the second electrode, the second tab having a second drawn portion which is stretchable.

The second drawn portion may be made up of a plurality of corrugations, and the width of the second drawn portion may be greater than $\frac{1}{10}$ of the width of the inside of the case and less than $\frac{1}{2}$ of the width of the inside of the case.

A support portion may be bent from the upper end of the second tab so as to be parallel to the cap plate and welded to the cap plate.

Another aspect is a rechargeable battery comprising: an electrode assembly including a first electrode, a second electrode, and a separator interposed between the first and second electrodes; a case accommodating the electrode assembly, wherein an opening is formed in the case; a cap plate coupled to and closing the opening of the case; a terminal placed to pass through the cap plate; and a first tab interconnecting the terminal and the first electrode, wherein the first tab includes a first drawn portion which is stretchable.

In the above battery, the first drawn portion includes a plurality of corrugations. In the above battery, the first drawn portion has a substantially wave shape or a substantially saw-tooth shape. In the above battery, the width of the first drawn portion is greater than about $\frac{1}{10}$ of the interior width of the case and less than about $\frac{1}{2}$ of the interior width of the case. In the above battery, the first tab further comprises a support portion bent at the upper end of the first tab so as to be substantially parallel to the cap plate and electrically connected to the terminal. In the above battery, the first tab further comprises a current collecting connector interconnecting the first electrode and the first drawn portion. In the above battery, the first tab further comprises an insulating tape wrapped around a portion of the current collecting connector.

The above battery further comprises a second tab interconnecting the cap plate and the second electrode placed at the second electrode, wherein the second tab includes a second drawn portion which is stretchable. In the above battery, the second drawn portion includes a plurality of corrugations. In the above battery, the second drawn portion has a substantially wave shape or a substantially saw-tooth shape. In the above battery, the width of the second drawn portion is greater than about $\frac{1}{10}$ of the interior width of the case and less than about $\frac{1}{2}$ of the interior width of the case. The above battery further comprises a support portion bent at the upper end of the second tab so as to be substantially parallel to the cap plate and connected to the cap plate. In the above battery, the support portion is welded to the cap plate.

Another aspect is a rechargeable battery comprising: an electrode assembly including a first electrode, a second electrode, and a separator interposed between the first and second electrodes; a case accommodating the electrode assembly, wherein an opening is formed in the case; a cap plate closing the opening of the case; a terminal placed to pass through the cap plate; and a first tab interconnecting the terminal and the first electrode, wherein at least a portion of the first tab is stretchable.

In the above battery, the stretchable portion of the first tab has a substantially wave shape or a substantially saw-tooth shape. In the above battery, the width of the stretchable portion of the first tab is greater than about $\frac{1}{10}$ of the interior width of the case and less than about $\frac{1}{2}$ of the interior width of the case. In the above battery, the first tab further comprises: a current collecting connector interconnecting the first electrode and the stretchable portion; and an insulating tape wrapped around a portion of the current collecting connector. The above battery further comprises a second tab interconnecting the cap plate and the second electrode placed at the second electrode, wherein at least a portion of the second tab is stretchable. In the above battery, the stretchable portion of the second tab has a substantially wave shape or a substantially saw-tooth shape. In the above battery, the width of the stretchable portion of the second tab is greater than about 1/10 of the interior width of the case and less than about 1/2 of the interior width of the case.

According to at least one of the disclosed embodiments, the drawn portions formed on the tabs allow the tabs to be stretchable, and accordingly prevent the positive or negative electrode from being deformed by the tabs.

DETAILED DESCRIPTION OF CERTAIN INVENTIVE EMBODIMENTS

Figure 1:
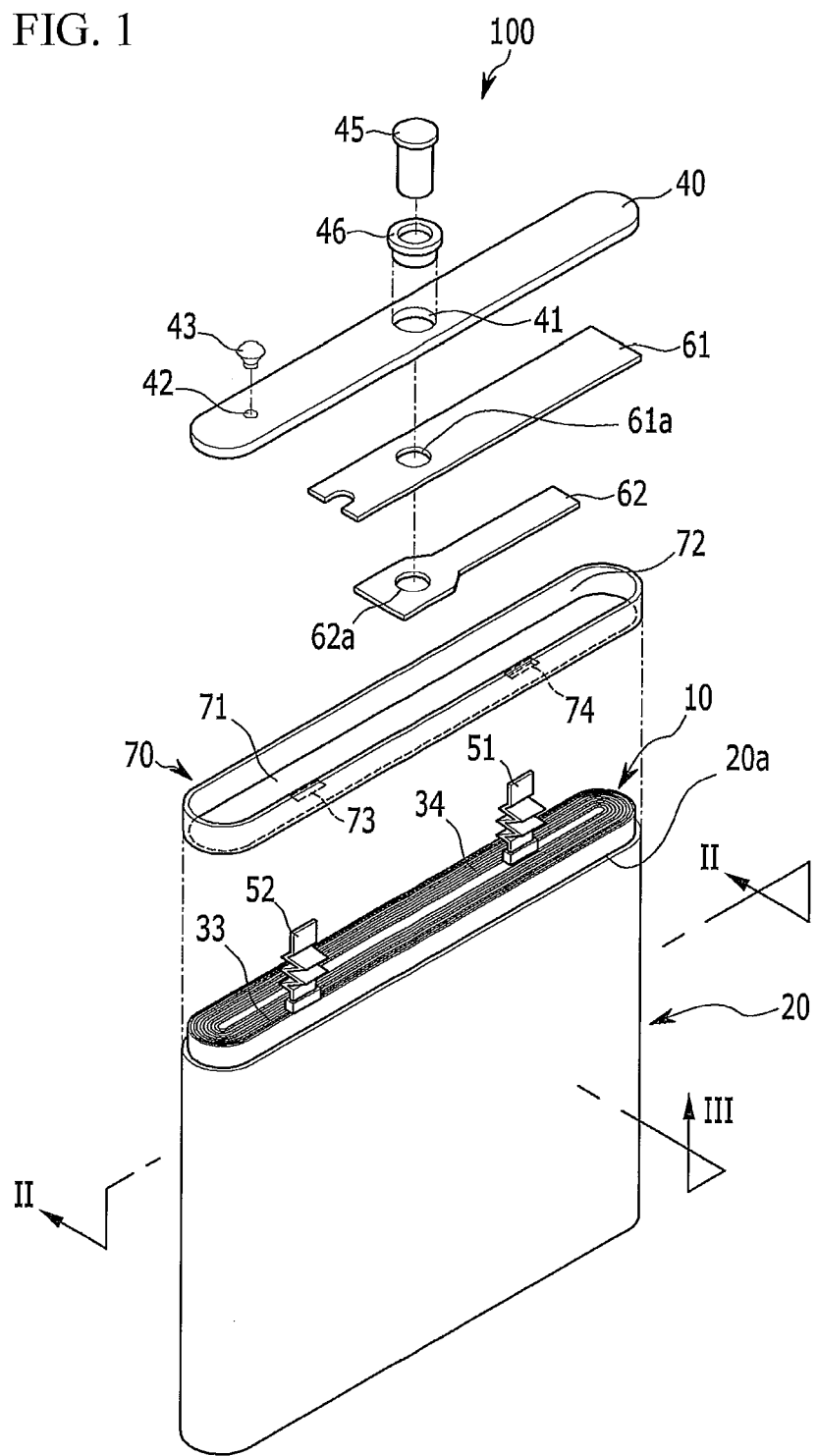
FIG. 1 is an exploded perspective view showing a rechargeable battery according to an exemplary embodiment.

Generally, a battery terminal is electrically connected to a positive electrode or negative electrode by a tab attached to one of the two electrodes by welding. If the electrode is pulled or pushed by the tab in the procedure of assembling a rechargeable battery, the electrode can be deformed by corrugations.

Hereinafter, embodiments will be described in detail with reference to the accompanying drawings so that one of ordinary skill in the art may easily realize the present invention. However, the described technology may be embodied in many different forms and should not be construed as being limited to the embodiments set forth herein. Like reference numerals denote like constituent elements throughout the specification and the drawings.

Figure 2:
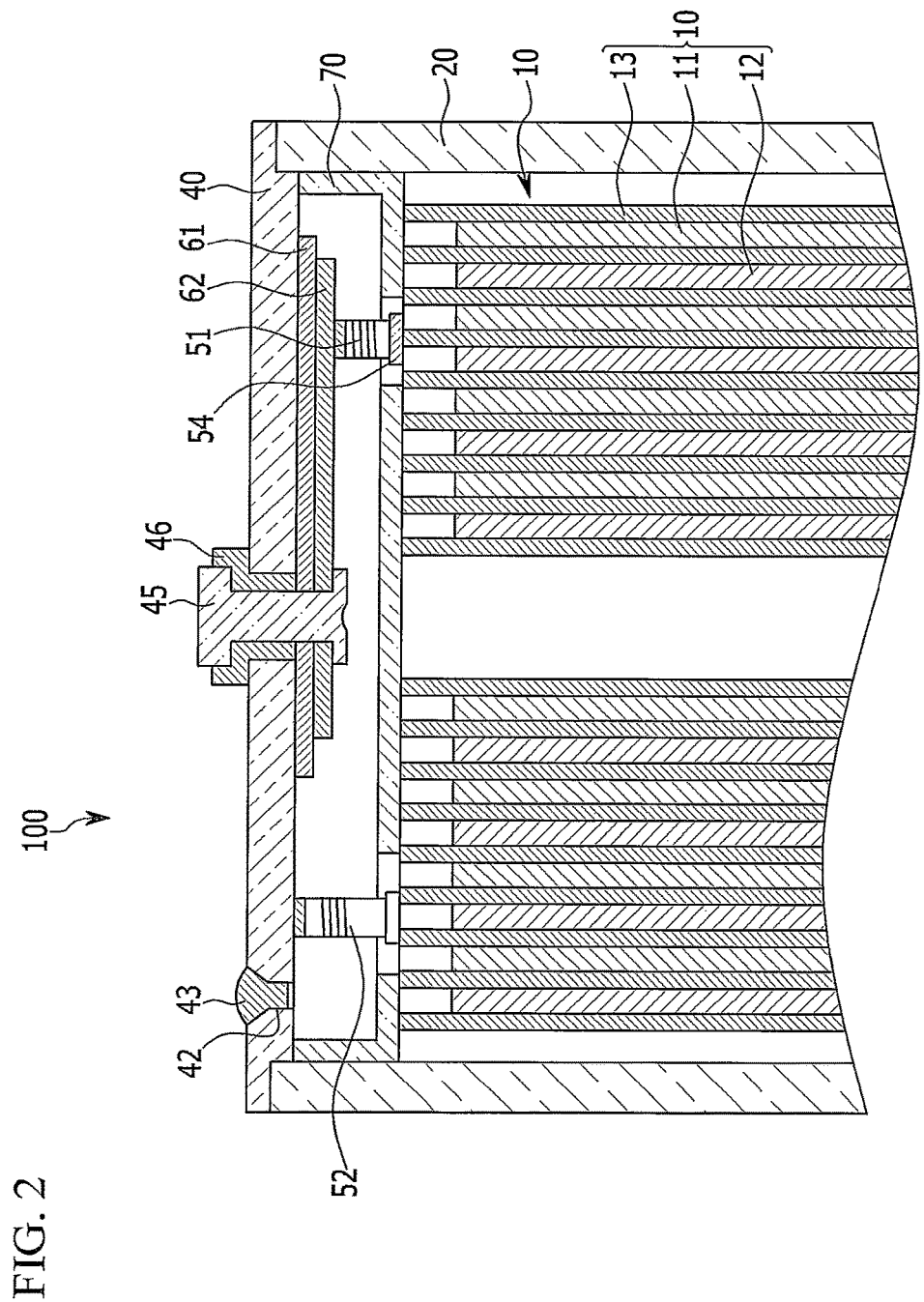
FIG. 2 is a cross-sectional view taken along line II-II.

FIG. 1 is an exploded perspective view showing a rechargeable battery 100 according to a first exemplary embodiment, and FIG. 2 is a cross-sectional view taken along line II-II.

Referring to FIG. 1 and FIG. 2, the rechargeable battery 100 includes an electrode assembly 10, a case 20, and a cap assembly 40. Although a rectangular battery will be described below as an example, the present invention is not limited to this example and can be applied to a variety of rechargeable batteries such as pouch batteries and lithium-polymer batteries.

The electrode assembly 10 includes a negative electrode (first electrode) 12, a positive electrode (second electrode) 11, and a separator 13 located between the negative and positive electrodes 12 and 13. The two electrodes 12 and 11 are wound, with the separator 13 acting as an insulator being interposed between them, to form a jelly-roll shape.

However, the present invention is not limited thereto, and the electrode assembly may have a sequential laminated structure of the positive electrode, the separator, and the negative electrode, with the separator interposed between the positive and negative electrodes.

A negative electrode tab (first tab) 51 can be connected to the negative electrode 12, and a positive electrode tab (second tab) 52 can be connected to the positive electrode 11. The positive and negative electrode tabs 52 and 51 are arranged substantially parallel to the winding axis, and are placed in such a way as to protrude from a section of the electrode assembly 10 that exposes layers. The positive and negative electrode tabs 52 and 51 protrude in the direction in which an opening is formed in a case 20, spaced a predetermined distance apart from each other, and electrically insulated.

The positive electrode tab 52 can be formed of an electrically-conductive material such as nickel or aluminum, and electrically connected to the cap plate 40. The negative electrode tab 51 can be formed of an electrically-conductive material such as copper or nickel, and electrically connected to the cap plate 40.

The case 20 has an opening 20a formed on the upper end to hold the electrode assembly 10. The case 20 provides an internal space for holding the electrode assembly 10 and an electrolyte solution, and is electrically connected to the positive electrode tab 52. The case 20 may be manufactured by processing aluminum or an aluminum alloy by a method such as metal deep drawing.

The cap plate 40 is coupled to the opening 20a of the case 20 to seal or close the opening 20a of the case 20, and can be formed of an electrically-conductive metal material such as aluminum or an aluminum alloy. The positive electrode 52 is attached to the bottom face of the cap plate 40 by, for example, welding, and hence the cap plate 40 is charged positively.

An insulation case 70 is placed between the electrode assembly 10 and the cap plate 40. The insulation case 70 includes a base 71 and a sidewall 72 protruding from the side edge of the base 71. The base 71 is plate-shaped, and the base 71 has a first tab hole 73 through which the positive electrode tab 52 passes and a second tab hole 74 through which the negative electrode tab 51 passes. The sidewall 72 is formed extending along the circumference of the base 71.

A terminal 45 is positioned in the center of the cap plate 40, and placed to pass through a terminal hole 41 formed in the cap plate 40. The terminal 45 is placed at the cap plate 40 by the medium of an insulation gasket 46, and the insulation gasket 46 electrically insulates the terminal 45 and the cap plate 40 while enclosing the terminal 45.

An electrolyte solution injection hole 42 acting as a path for injecting an electrolyte solution is provided in the cap plate 40. A stopper 43 is inserted into the electrolyte solution injection hole 42 to close the electrolyte solution injection hole 42.

The terminal 45 is placed in such a way as to pass through the cap plate 40 and a connecting plate 62. The connecting plate 62 is located between the electrode assembly 10 and the cap plate 40, within the case 20. The connecting plate 62 is plate-shaped, and the connecting plate 62 has a terminal hole 62a through which the terminal 45 passes.

After being placed in such a way as to pass through the cap plate 40 and the connecting plate 62, the terminal 45 can be connected to the cap plate 40 and the connecting plate 62 by, for example, riveting. The negative electrode tab 51 can be connected to the connecting plate 62 by, for example, welding, and accordingly the terminal 45 may be electrically connected to the negative electrode 12 by the medium of the connecting plate 62 and the negative electrode tab 51.

An insulating plate 61 for insulating the connecting plate 62 from the cap plate 40 is placed between the cap plate 40 and the connecting plate 62. The insulating plate 61 is an electrically insulative plate, and arranged substantially parallel to the cap plate 40. A terminal hole 61 through which the terminal 45 passes is formed in the insulating plate 61.

Figure 3:
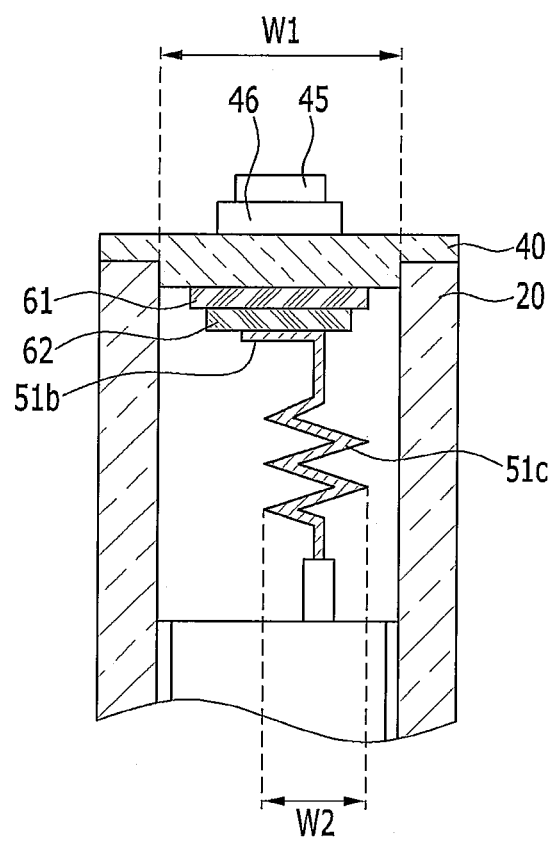
FIG. 3 is a partial longitudinal sectional view taken along line of the rechargeable battery of FIG. 1.
Figure 4:
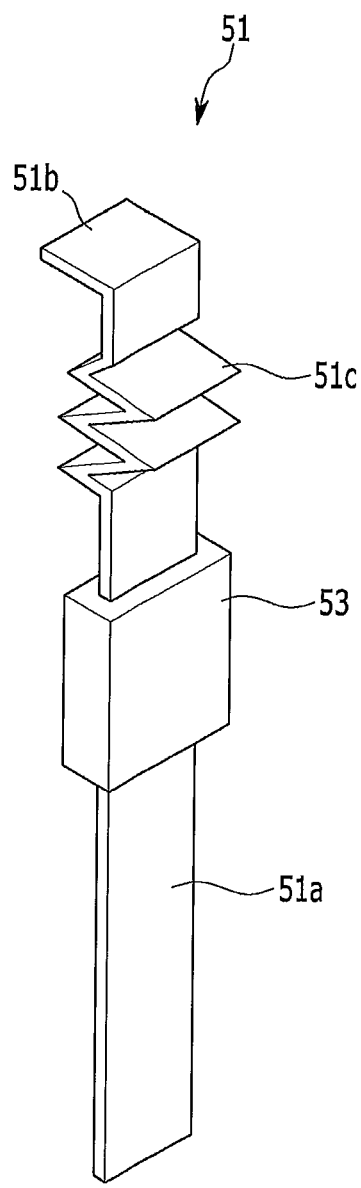
FIG. 4 is a perspective view showing a negative electrode tab of the rechargeable battery of FIG. 1.

FIG. 3 is a partial longitudinal sectional view taken along the thickness of a rechargeable battery according to an exemplary embodiment, and FIG. 4 is a perspective view showing a negative electrode tab according to an exemplary embodiment.

Referring to FIG. 3 and FIG. 4, the negative electrode tab 51 includes a current collecting connector 51a shaped like a bar and attached to the negative electrode 12 and a support portion 51b that bends at the upper end of the current collecting connector 51a.

The lower part of the current collecting connector 51a can be attached to the negative electrode 12 by, for example, ultrasonic welding or resistance welding. The current collecting connector 51a is attached to a negative uncoated region of the negative electrode 12 where no active material layer is formed. The upper part of the current collecting connector 51a protrudes outwardly from the electrode assembly 10, and insulating tape 53 for insulation is wound on the current collecting connector 51a.

A first drawn portion 51c is formed in the upper part of the current collecting connector 51a. The first drawn portion 51c can include one or more corrugations. The first drawn portion 51c can have a substantially wave shape or a substantially saw-tooth shape. Furthermore, the first drawn portion 51c can include a plurality of triangular wave-like longitudinal sections. The first drawn portion 51c is positioned between the support portion 51b and the insulating tape 53.

Figure 5:
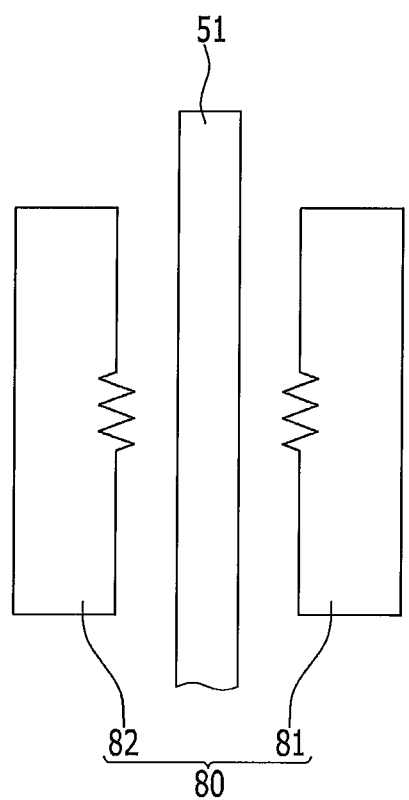
FIG. 5 is a view for explaining a process of forming a first drawn portion at the negative electrode tab of the rechargeable battery of FIG. 1.

In some embodiments, as shown in FIG. 5, the first drawn portion 51c is formed by a press machine 80, and the press machine 80 includes a first die 81 and a second die 82, each of which having a plurality of grooves. The positive electrode tab 51 positioned between the first and second dies 81 and 82 is pressed by the two dies 81 and 82, thereby forming the first drawn portion 51c made up of corrugations.

The width W2 of the first drawn portion 51c may be greater than about $1/10$ of the interior width W1 of the case 20 and less than about $1/2$ of the width W1. The above ranges can provide an optimum balance between i) preventing or minimizing a short-circuit between the negative electrode tab 51 and the case 20 and ii) preventing or minimizing the negative electrode being pulled or pushed to form corrugations. However, depending on embodiments, the width W2 can be less than about $1/10$ of the width W1 or greater than about $1/2$ of the width W1. This applies to the second drawn portion 52c.

The support portion 51b bends at the upper end of the current collecting connector 51a, and is arranged substantially parallel to the cap plate 40. The support portion 51b is welded, for example, to the connecting plate 62, and accordingly the terminal 45 is electrically connected to the negative electrode tab 51 by the medium of the connecting plate 62.

Figure 6:
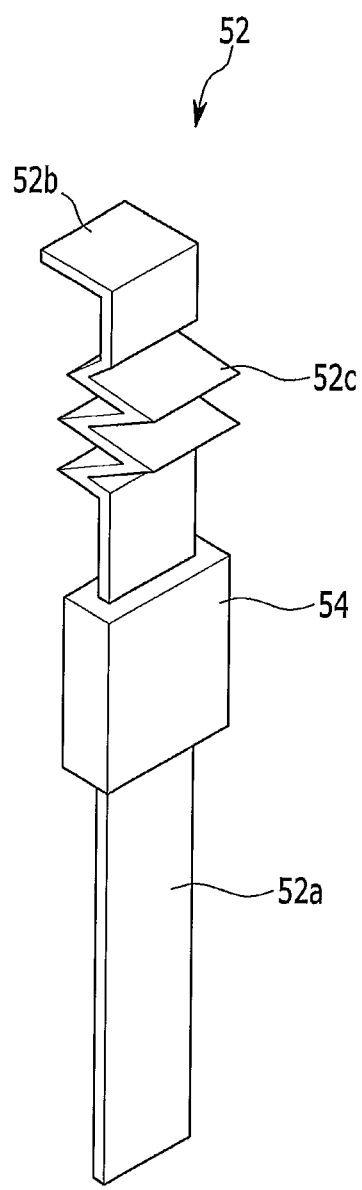
FIG. 6 is a perspective view showing a positive electrode tab of the rechargeable battery of FIG. 1.

FIG. 6 is a perspective view showing a positive electrode tab according to an exemplary embodiment.

Referring to FIG. 6, the positive electrode tab 52 includes a current collecting connector 52a shaped like a bar and attached to the positive electrode 11 and a support portion 52b that bends at the upper end of the current collecting connector 52a.

The lower part of the current collecting connector 52a can be attached to the positive electrode 11 by, for example, ultrasonic welding or resistance welding. The current collecting connector 52a is attached to a positive uncoated region of the positive electrode 11 where no active material layer is formed. The upper part of the current collecting connector 52a protrudes outwardly from the electrode assembly 10, and insulating tape 54 for insulation is wound on the current collecting connector 52a.

A second drawn portion 52c is formed in the upper part of the current collecting connector 52a. The second drawn portion 52e can include one or more corrugations. The second drawn portion 52c can have a substantially wave shape or a substantially saw-tooth shape. Furthermore, the second drawn portion 52c can include a plurality of triangular wave-like longitudinal sections, and the second drawn portion 52c is positioned between the support portion 52b and the insulating tape 54. The width of the second drawn portion 52c may be greater than about $1/10$ of the interior width of the case 20 and less than about $1/2$ of the interior width of the case 20.

The support portion 52b bends at the upper end of the current collecting connector 52a, and is arranged substantially parallel to the cap plate 40. The support portion 52b can be welded to the cap plate 40, and accordingly the cap plate 40 is electrically connected to the positive electrode 11 by the medium of the positive electrode tab 52.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly including a first electrode, a second electrode, and a separator interposed between the first and second electrodes;
   a case accommodating the electrode assembly, wherein an opening is formed in the case;
   a cap plate coupled to and closing the opening of the case;
   a terminal placed to pass through the cap plate;
   a first tab interconnecting the terminal and the first electrode, wherein the first tab includes a first drawn portion which is stretchable, and wherein the first drawn portion is placed inside the case and extends toward the opening of the case;
   a second tab interconnecting the cap plate and the second electrode, wherein the second tab includes a second drawn portion which is stretchable, and wherein the second drawn portion is placed inside the case and extends toward the opening of the case; and
   a connecting plate connected to the terminal, wherein the first tab is directly connected to the connecting plate, wherein the first drawn portion includes a plurality of corrugations, and wherein the first tab further comprises a support portion bent at the upper end of the first tab so as to be substantially parallel to the cap plate and electrically connected to the terminal.

2. The rechargeable battery of claim 1, wherein the first drawn portion has a substantially wave shape or a substantially saw-tooth shape.

3. The rechargeable battery of claim 1, wherein the width of the first drawn portion is greater than about $1/10$ of the interior width of the case and less than about $1/2$ of the interior width of the case.

4. The rechargeable battery of claim 1, wherein the first tab further comprises a current collecting connector interconnecting the first electrode and the first drawn portion.

5. The rechargeable battery of claim 4, wherein the first tab further comprises an insulating tape wrapped around a portion of the current collecting connector.

6. The rechargeable battery of claim 1, wherein the second drawn portion includes a plurality of corrugations.

7. The rechargeable battery of claim 6, wherein the second drawn portion has a substantially wave shape or a substantially saw-tooth shape.

8. The rechargeable battery of claim 6, wherein the width of the second drawn portion is greater than about 1/10 of the interior width of the case and less than about 1/2 of the interior width of the case.

9. The rechargeable battery of claim 6, further comprising a support portion bent at the upper end of the second tab so as to be substantially parallel to the cap plate and connected to the cap plate.

10. The rechargeable battery of claim 9, wherein the support portion is welded to the cap plate.

11. A rechargeable battery comprising:
    an electrode assembly including a first electrode, a second electrode, and a separator interposed between the first and second electrodes;
    a case accommodating the electrode assembly, wherein an opening is formed in the case;
    a cap plate closing the opening of the case;
    a terminal placed to pass through the cap plate;
    a first tab interconnecting the terminal and the first electrode, wherein at least a portion of the first tab is stretchable, and wherein the stretchable portion of the first tab is placed inside the case and extends toward the opening of the case;
    a second tab interconnecting the cap plate and the second electrode, wherein at least a portion of the second tab is stretchable, and where the stretchable portion of the second tab is placed inside the case and extends toward the opening of the case; and
    a connecting plate connected to the terminal, wherein the first tab is directly connected to the connecting plate,
    wherein the stretchable portion of the first tab includes a plurality of corrugations, and
    wherein the first tab further comprises a support portion bent at the upper end of the first tab so as to be substantially parallel to the cap plate and electrically connected to the terminal.

12. The rechargeable battery of claim 11, wherein the stretchable portion of the first tab has a substantially wave shape or a substantially saw-tooth shape.

13. The rechargeable battery of claim 11, wherein the width of the stretchable portion of the first tab is greater than about 1/10 of the interior width of the case and less than about 1/2 of the interior width of the case.

14. The rechargeable battery of claim 11, wherein the first tab further comprises:
    a current collecting connector interconnecting the first electrode and the stretchable portion; and
    an insulating tape wrapped around a portion of the current collecting connector.

15. The rechargeable battery of claim 11 wherein the stretchable portion of the second tab has a substantially wave shape or a substantially saw-tooth shape.

16. The rechargeable battery of claim 11, wherein the width of the stretchable portion of the second tab is greater than about 1/10 of the interior width of the case and less than about 1/2 of the interior width of the case.

* * * * *